(12) United States Patent
MacDonald et al.

(10) Patent No.: US 6,825,786 B1
(45) Date of Patent: Nov. 30, 2004

(54) ASSOCIATIVE NOISE ATTENUATION

(75) Inventors: James R. MacDonald, Buda, TX (US); Drew J. Dutton, Austin, TX (US); Stephen Cox, Lakeway, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 0 days.

(21) Appl. No.: 10/430,863

(22) Filed: May 6, 2003

(51) Int. Cl.[7] .............................................. H03M 1/66
(52) U.S. Cl. ...................................... 341/144; 341/139
(58) Field of Search .............................. 341/118, 120, 341/139, 143, 144; 381/71.4, 71.5, 71.9, 86

(56) References Cited

U.S. PATENT DOCUMENTS

| | | | | |
|---|---|---|---|---|
| 4,160,873 A | * | 7/1979 | Beseke et al. | 370/284 |
| 5,415,522 A | | 5/1995 | Pla et al. | |
| 5,572,350 A | * | 11/1996 | Spanke | 398/54 |
| 5,715,309 A | * | 2/1998 | Bartkowiak | 379/406.07 |
| 6,271,781 B1 | * | 8/2001 | Pellon | 341/143 |
| 6,408,008 B1 | * | 6/2002 | Komarek et al. | 370/458 |
| 6,506,968 B1 | * | 1/2003 | Kurihara | 84/604 |
| 6,522,984 B1 | * | 2/2003 | Jordanov | 702/107 |
| 2001/0046300 A1 | * | 11/2001 | McLean | 381/71.4 |

OTHER PUBLICATIONS

Minogue, et al., "Adaptively Canceling Server Fan Noise," Analog Dialogue 34–2 (2000), pp. 1–6.
Arnaud Charpentier, "Active Control of Noise Radiated From Personal Computers," Nov. 11, 2002 (master's thesis).

* cited by examiner

*Primary Examiner*—Michael Tokar
*Assistant Examiner*—Linh V Nguyen
(74) *Attorney, Agent, or Firm*—Meyertons Hood Kivlin Kowert & Goetzel, P.C.; Jeffrey C. Hood (57) ABSTRACT

A system may include a memory configured to store an attenuation waveform and control logic. The control logic is configured to receive a synchronizing signal indicative of an operating characteristic of a noise source. In response to a value of a characteristic (e.g., frequency) of the synchronizing signal, the control logic is configured to output the attenuation waveform from the memory if the attenuation waveform is associated with that value of the characteristic of the synchronizing signal. An attenuating noise generated dependent on the attenuation waveform attenuates a noise generated by the noise source.

32 Claims, 4 Drawing Sheets

FIG. 4

ASSOCIATIVE NOISE ATTENUATION

BACKGROUND OF THE INVENTION

1. Field of the Invention

This invention relates to the reduction of noise in consumer electronics and, more particularly, to active noise cancellation.

2. Description of the Related Art

Active noise cancellation techniques are often used to reduce noise. Typically, active noise cancellation involves detecting the noise generated by a system and generating a responsive cancellation wave that will reduce or even eliminate the noise. Noise detection is typically performed using a microphone. The analog signal detected by the microphone is converted into a digital signal by an ADC (Analog to Digital Converter), which is processed by a DSP (Digital Signal Processor) to generate a compensating digital signal. The compensating digital signal is provided to a DAC (Digital to Analog Converter), which converts the digital signal into an analog signal for input to a speaker. While often effective, active noise cancellation techniques require expensive processing components and extensive hardware (e.g., microphones, ADC, DSP, DAC, speakers).

Consumer electronics contain numerous noise sources. For example, computer systems include components such as fans, power supplies, and disk drives, each of which may generate noise as it operates. However, these components may be critical to system functionality. Furthermore, given the size and/or cost of consumer electronics, it may be impractical or uneconomical to include typical active noise cancellation devices in consumer electronics. If conventional noise cancellation techniques are unavailable, designers of many consumer electronics are forced to balance necessary functionality such as cooling against noise. This trade-off may affect the performance, placement, size, life, serviceability, and support cost of the product if less functionality is provided in an attempt to reduce noise. For example, product improvements may be limited by the lack of a cooling fan in products in which a cooling fan is not currently an option due to the unacceptability of its noise. Many products that include fans are not optimal designs, have reduced features, or cost significantly more in order to keep fan noise within customer acceptable limits. Accordingly, new active noise cancellation devices are desirable for use in consumer electronics.

SUMMARY

Various embodiments of a method and apparatus for providing associative noise attenuation are disclosed. In one embodiment, a system may include a memory configured to store an attenuation waveform and control logic. The control logic is configured to receive a synchronizing signal indicative of an operating characteristic of a noise source. In response to a value of a characteristic (e.g., frequency) of the synchronizing signal, the control logic is configured to output the attenuation waveform from the memory if the attenuation waveform is associated with that value of the characteristic of the synchronizing signal. An attenuating noise generated dependent on the attenuation waveform attenuates a noise generated by the noise source.

In some embodiments, the system may also include a DAC (Digital to Analog Converter) configured to generate an analog attenuation signal from a digital representation of the attenuation waveform stored in the memory. The system may also include an actuator configured to generate the attenuating noise in response to the analog attenuation signal from the DAC.

The memory may be configured to store digital representations of a plurality of attenuation waveforms. Each of the digital representations may be associated with a respective value of the characteristic of the synchronizing signal.

The attenuation waveform may be associated with a range of values of the characteristic of the synchronizing signal. The control logic may be configured to output the attenuation waveform from the memory if the value of the operating characteristic is within the range of values of the characteristic. The control logic may be configured to output the attenuation waveform from the memory if an associated value of the characteristic associated with the attenuation waveform is closer to the value of the characteristic of the synchronizing signal than any other associated values of the characteristic associated with other attenuation waveforms stored in the memory. The control logic may be configured to perform interpolation on the attenuation waveform dependent on a relationship between the value of the characteristic of the synchronizing signal and the associated value of the characteristic associated with the attenuation waveform.

The system may include a processing device configured to modify the attenuation waveform dependent on the value of the characteristic of the synchronizing signal prior to generation of the attenuating noise dependent on the attenuation waveform. For example, the processing device may be configured to adjust an amplitude of the attenuation waveform dependent on the value of the characteristic. Similarly, the processing device may be configured to adjust a frequency of the attenuation waveform dependent on the value of the characteristic of the synchronizing signal.

In one embodiment, the characteristic of the synchronizing signal may be the frequency of the synchronizing signal. The synchronizing signal may be a tachometer signal indicative of revolutions per unit time of a rotating component included in the noise source. Alternatively, the synchronizing signal may be indicative of an air density measured proximate to the noise source. In other embodiments, the synchronizing signal may be indicative of a system load of the noise source, wherein the noise source includes a power supply. The synchronizing signal may be a non-acoustic signal (e.g., the synchronizing signal may be indicative of a non-acoustical operating characteristic of the noise source).

An embodiment of a method may include: a memory storing an attenuation waveform; receiving a synchronizing signal indicative of an operating characteristic of a noise source; if the attenuation waveform is associated with a value of a characteristic of the synchronizing signal, outputting the attenuation waveform from the memory in response to receiving the synchronizing signal; and an actuator generating an attenuating noise dependent on the attenuation waveform in response to said outputting.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

Figure 1:
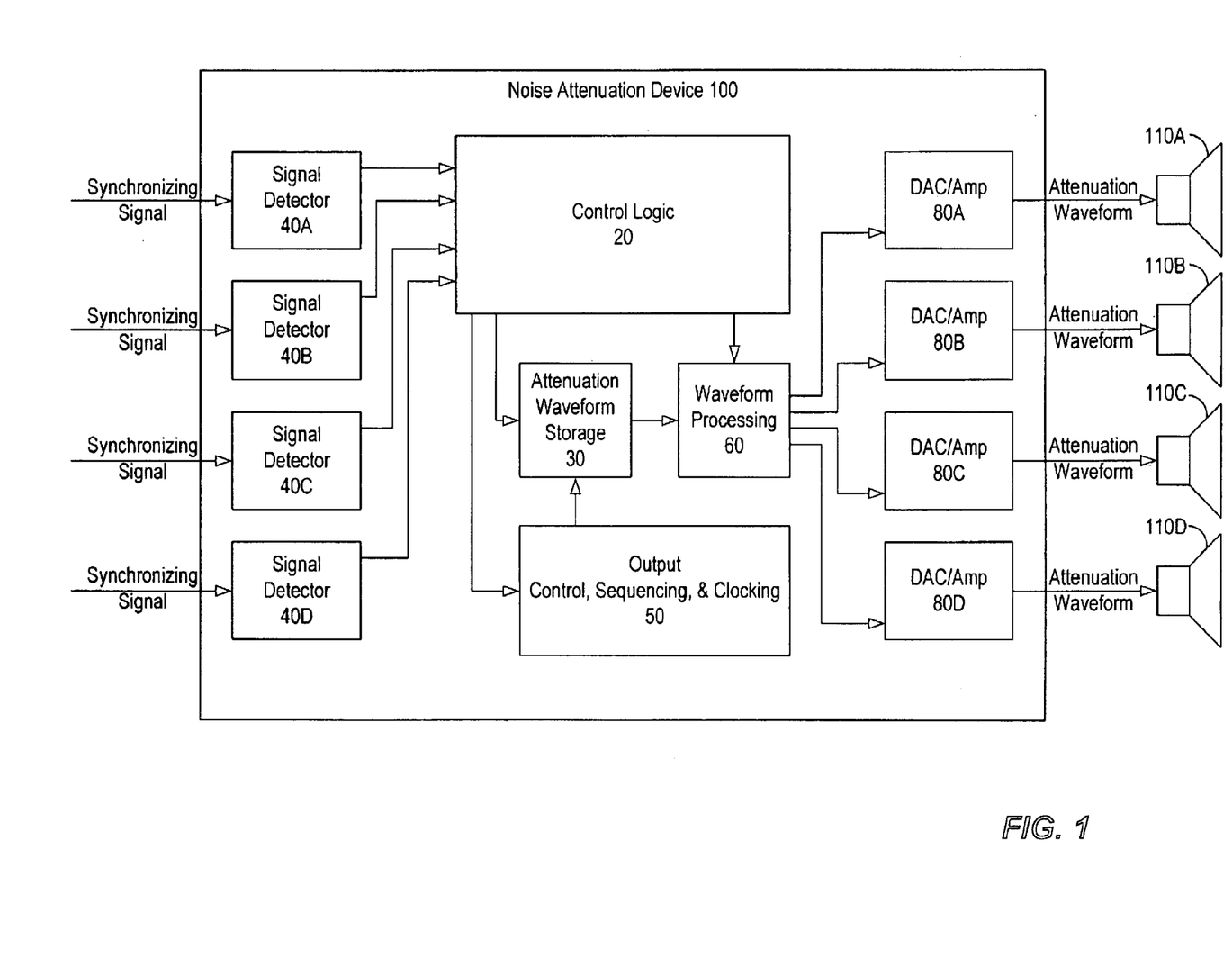
FIG. 1 shows a noise attenuation device 100, according to one embodiment.

FIG. 1 shows a noise attenuation device 100, according to one embodiment. Noise attenuation device 100 is configured to perform associative noise attenuation for a noise source based on a synchronizing signal generated by or associated with the operation of that noise source. Based on one or more characteristics of the synchronizing signal, noise attenuation device 100 selects a pre-defined attenuation waveform associated with those characteristics. Application of the selected attenuation waveform to an actuator generates an attenuating noise that may attenuate the noise generated by the noise source.

As shown in FIG. 1, a noise attenuation device may include: one or more signal detectors 40 (here, four signal detectors 40A–40D are shown); one or more DACs (Digital to Analog Converters) and/or amplifiers (Amps) 80 (here, four DAC/Amp units 80A–80B are shown); control logic 20; attenuation waveform storage 30; output control, sequencing, and clocking unit 50; and waveform processing unit 60. The noise attenuation device 100 may be coupled to receive one or more synchronizing signals via signal detectors 40 and, based on those synchronizing signals, select one or more predefined attenuation waveforms from attenuation waveform storage 30 to output to one or more actuators such as speakers 100A–100D.

The attenuation waveform storage 30 may be implemented using various memory technology (e.g., flash memory, ROM (Read Only Memory)). Storage 30 may store digital representations of several pre-defined attenuation waveforms. Information indicative of the synchronizing signal and synchronizing signal characteristic(s) with which each pre-defined attenuation waveform is associated may also be stored in storage 30. In some embodiments, the attenuation waveform storage 30 may be updated at various times. For example, a large set of pre-defined attenuation waveforms and/or information associating pre-defined attenuation waveforms with synchronizing signal characteristics may be stored externally to the noise attenuation device 100 (e.g., in a less expensive mass storage device). At any given time, a subset of these pre-defined attenuation waveforms may be loaded into the attenuation waveform storage 30. If any of various system characteristics change (e.g., if the type, age, or orientation of the noise source changes), new pre-defined attenuation waveforms may be loaded from the external storage into attenuation waveform storage 30. Noise attenuation device 100 may include data inputs/outputs (not shown) to facilitate reading and/or writing data in attenuation waveform storage 30.

Control logic 20 may be configured to access information stored in storage 30 (e.g., to access information indicating which pre-defined attenuation waveform is associated with a particular synchronizing signal characteristic) and to cause information from storage 30 to be output to an actuator (e.g., via waveform processing unit 60 and/or DAC/Amp units 80). Control logic 20 may generate control signals to output unit 50 to control the output of attenuation waveforms from storage 30 (e.g., by controlling the rate at which data is clocked out of storage 30).

A synchronizing signal may be a signal that is generated by a noise source during operation of that noise source. In some embodiments, the synchronizing signal may not be an actual measurement of the noise currently being generated by the noise source. Instead, the synchronizing signal may be a non-acoustic signal such as a tachometer signal indicative of a current rotational speed (e.g., of a fan or disk drive), a signal indicative of system load (e.g., if the noise source is a power supply), a signal indicative of jitter (e.g., if the noise source is a power supply), etc. In some embodiments, the synchronizing signal may be a signal indicative of a condition, such as vibration, air density, or pressure, measured at or near the noise source during operation of the noise source. A synchronizing signal for a given noise source may vary over the noise source's operating range such that variations in a characteristic of the synchronizing signal correlate to variations in the noise generated by the noise source over its operating range.

Noise attenuation device 100 may receive several synchronizing signals from a single noise source, a single synchronizing signal from a single noise source, and/or single synchronizing signals from each of several noise sources. In response to receiving a synchronizing signal, a pre-defined of an attenuation waveform associated with that synchronizing signal may be output to one or more DAC/Amp units 80. In some embodiments, noise attenuation device 100 may be programmable to select which signal detector(s) 40 to associate with each DAC/Amp unit 80. For example, noise attenuation device 100 may be programmed to receive two synchronizing signals associated with a single noise source via signal detectors 40A and 40B and to responsively output a predefined attenuation waveform associated with the current values of those synchronizing signals via DAC/Amp unit 80A. Noise attenuation device 100 may be programmed to receive an additional synchronizing signal associated with a different noise source via signal detector 40C and to responsively output an associated pre-defined attenuation waveform via DAC/Amp unit 80B. Noise attenuation device 100 may also be programmed to receive a fourth synchronizing signal associated with yet another noise source may be received via signal detector 40D and to responsively output an associated pre-defined attenuation waveform via DAC/Amp units 80C and 80D. A noise attenuation device 100 may have many other programmable or non-programmable configurations.

The control logic 20 may be configured to receive each synchronizing signal detected by a signal detector 40 and to determine whether a pre-defined attenuation waveform stored in attenuation waveform storage 30 is associated with that synchronizing signal. For example, various attenuation waveforms stored in attenuation waveform storage 30 may be associated with respective frequencies of the synchronizing signal. Dependent on the current frequency of the synchronizing signal detected by a signal detector 40, the control logic 20 may determine which of several attenuation waveforms stored in attenuation waveform storage is associated with the current frequency and cause the attenuation waveform storage 30 to output the associated attenuation waveform. For example, noise sources such as fans, power supplies, and transformers may generate noise that is periodic in nature. Synchronizing signals for such noise sources may have frequencies that are often related to the frequency of the noise. In such situations, the noise attenuation device 100 may select the attenuation waveform that is associated with the current frequency of the synchronizing signal.

Note that the control logic 20 selects a pre-defined waveform to output based on whether that pre-defined waveform is associated with the current synchronizing signal instead of algorithmically calculating a waveform from the current synchronizing signal. The pre-defined waveforms stored in attenuation waveform storage 30, as well as information indicative of the association between each pre-defined waveform and a synchronizing signal, may be generated by a system such as the one shown in FIG. 3 and programmed into the noise attenuation device 100 prior to operation of noise attenuation device 100. In other words, the control logic 20 may perform little or no real-time algorithmic processing of the synchronizing signal to obtain an attenuation waveform. Instead, the algorithmic processing needed to generate an attenuation waveform may be performed by a development system like the one shown in FIG. 3. Accordingly, in some embodiments, control logic 20 and waveform processing unit 60 may be implemented using less complex hardware than is needed to algorithmically generate attenuation waveforms from synchronizing signals. In some such embodiments, this implementation may reduce the cost, size, and/or power consumption of noise attenuation device 100 relative to that of a device that algorithmically generates attenuation waveforms.

In some embodiments, pre-defined digital representations of attenuation waveforms may be stored for various points in a range of synchronizing signal characteristics. For example, if a synchronizing signal's frequency is capable of varying over a range, pre-defined attenuation waveforms may be associated with various frequency points within that range. When the frequency of the synchronizing signal is not equal to one of the frequencies with which a pre-defined waveform is associated, the control logic 20 may select the pre-defined waveform associated with the closest frequency to the actual frequency of the synchronizing signal. The control logic 20 may then provide control signals to waveform processing unit 60 indicative of how the selected pre-defined waveform should be adjusted to correspond with the actual synchronizing signal frequency. For example, the waveform processing unit 60 may perform frequency and/or amplitude adjustment on the pre-defined waveform based on the relationship between the actual synchronizing signal frequency and the synchronizing signal frequency associated with that pre-defined waveform. The waveform processing unit 60 may operate to interpolate between pre-defined waveforms associated with discrete points on the range of values of a synchronizing signal characteristic to obtain a modified waveform appropriate for an intermediate value of the synchronizing signal characteristic. For example, if the attenuation waveform for different fan speeds is identical other than the rate at which the waveform is sent to the output device or the waveform's amplitude, then a reduced number of attenuation waveforms may be stored in the memory 30. The attenuation waveforms may then be adjusted or interpolated between known points of operation and attenuation. This process of adjustment and/or interpolation may be similar to how sampling music synthesizers operate.

In some embodiments, interpolation or modification of a selected attenuation waveform may be used to adjust for one or more of various known or measurable factors, such as temperature, noise source age, or barometric pressure. For example, as a fan ages, the noise generated by that fan may change due to bearing wear or dirt/dust accumulation. A noise attenuation device 100 configured to attenuate noise generated by that fan may select a predefined attenuation waveform based on the frequency of the tachometer signal generated by that fan. The noise attenuation device 100 may also track or receive an indication of the current age of the fan. The noise attenuation device 100 may then modify the selected attenuation waveform dependent on the current age of the fan.

In some embodiments, the noise attenuation device 100 may combine and/or interpolate between several selected pre-defined attenuation waveforms to form a compound attenuation waveform. The noise attenuation device 100 may output such a combination waveform via one or more DAC/Amp units 80. For example, the noise source may include several fans. Each fan may generate a tachometer signal that is input to a respective signal detector 40. The control logic 20 may select an associated predefined attenuation waveform in memory 30 for each tachometer signal and combine the selected attenuation waveforms (e.g., by adding, scaling, and/or performing other operations on the selected attenuation waveforms) to form a compound attenuation waveform, which may then be output to a speaker or other actuator via a DAC/Amp unit 80.

Alternatively, in an embodiment configured to attenuate noise generated by multiple noise sources, each pre-defined attenuation waveform may be associated with a combination of different synchronizing signals (as opposed to each attenuation waveform being associated with a single synchronizing signal). For example, a given attenuation waveform may be associated with a set of tachometer frequencies, with each frequency in the set corresponding to a different fan's tachometer signal (e.g., a particular attenuation waveform may be associated with a set of three fans in which one fan is running at 2200 RPM, another fan is running at 1600 RPM, and yet another fan is running at 2800 RPM).

Output control, sequencing, and clocking unit 50 may select the rate at which waveforms are output from attenuation waveform storage 30. In one embodiment, output unit 50 may be used to adjust the frequency of the waveform being output from attenuation waveform storage 30. The output unit 50 may also allow multiple attenuation waveforms to each be output to a different DAC/Amp unit 80 at substantially the same time by alternating between which of the different waveforms is output in any given output cycle (e.g., dependent on the sample rate of the different waveforms).

Figure 2:
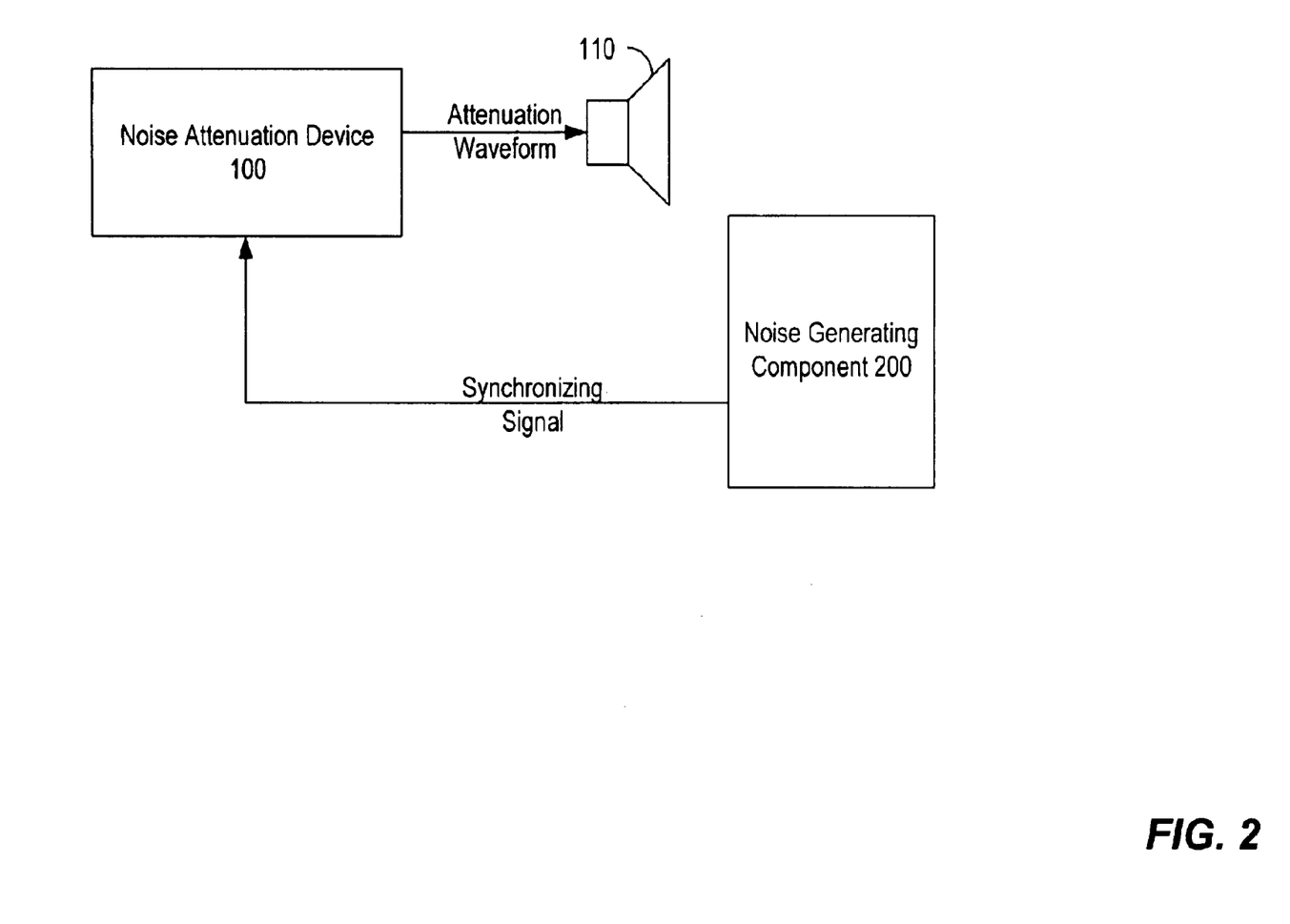
FIG. 2 illustrates an exemplary system that may include a noise attenuation device, according to one embodiment.

FIG. 2 illustrates an exemplary system that may include a noise attenuation device 100 that is configured to perform associative noise attenuation. Here, a noise source 200 generates noise while operating. Examples of different types of noise sources 200 include fans and other cooling devices, monitors (e.g., plasma monitors, LCDs (Liquid Crystal Displays), CRTs (Cathode Ray Tubes)), power supplies, and storage devices that include rotating media such as hard drives, CD (Compact Disc) drives, and DVD (Digital Versatile Disc) drives. These noise sources may be included in products such as computer systems, televisions, and projectors. For example, one or more fans may be included in a projector in order to remove heat generated by a bulb used in the projector. Similarly, noise sources may be included in consumer electronics like DVD players, standalone or rack-mounted receivers, and set-top boxes. Other noise sources include disk drives in set-top-boxes (PVR/DVRs) and transformers that produce "hum" in various consumer products.

In FIG. 2, a noise source 200 generates a synchronizing signal. Different types of synchronizing signals may be generated by different types of noise sources. For example, as mentioned above, a fan noise source may generate a tachometer signal as its synchronizing signal. Other noise sources with rotating parts such as disk drives may also generate tachometer signals as their synchronizing signals. As noted above, some noise sources may not generate synchronizing signals. Instead, synchronizing signals may be generated by sensors located around the noise source. Such sensors may be configured to detect conditions such as air density, vibration, and pressure and to provide synchronizing signals indicative of the detected conditions to the noise attenuation device 100.

The synchronizing signal is provided to the noise attenuation device 100. Based on one or more characteristics (e.g., frequency and/or amplitude) of the synchronizing signal, the noise attenuation device 100 selects a pre-defined attenuation waveform and outputs the selected waveform to an actuator such as speaker 110. The noise attenuation device 100 may, in some embodiments, modify the selected pre-defined waveform prior to outputting the waveform to the speaker 110.

When the selected attenuation waveform is output to the speaker 110, the speaker 110 generates noise. This noise may cancel out all or part of the noise generated by noise source 200. Placement of the speaker 110 may be selected relative to placement of noise-generating component 200 and the expected placement of a user (or users) such that the speaker's output will attenuate the noise heard by the user (or users) due to the operation of noise source 200.

Note that the attenuation waveform for a given noise source may differ from one environment to another. The same type of noise source may be associated with different attenuation waveforms depending on the placement and/or orientation of the noise source within an enclosure and/or relative to a user or the actuator that outputs the attenuating noise. For example, a fan running at 2500 RPM in one enclosure (or in one position) may have a different noise profile than the same fan in another enclosure (or position). Accordingly, the attenuation waveforms generated by the development system of FIG. 3 may vary depending on the overall system configuration.

In some embodiments, the source of the synchronizing signal (e.g., the noise source itself) and the speaker 110 may already be part of the system that includes the noise source 200. For example, the system may be a computer system that includes a fan noise source. The fan may generate a tachometer signal that is used by the computer system to detect whether the fan is operating correctly. The computer system may include speakers that provide multimedia functionality for the computer system. The noise attenuation device 100 may be configured to receive the tachometer signal and output attenuation waveforms to the pre-existing speakers. Accordingly, the noise attenuation device 100 may be incorporated in such a computer system without requiring additional sensors or actuators to perform noise attenuation.

Figure 3:
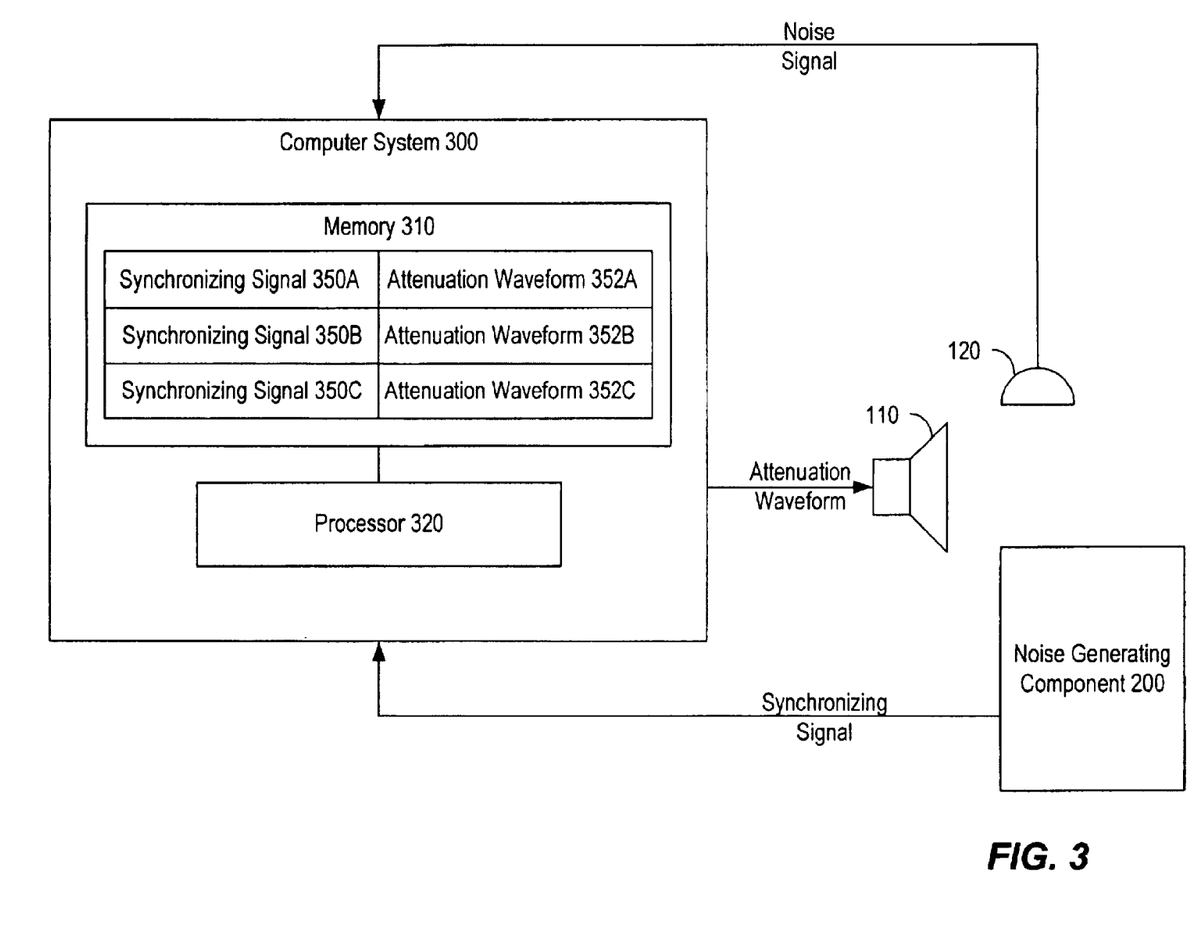
FIG. 3 shows a development system that may be used to generate the attenuation waveforms for storage in the noise attenuation device, according to one embodiment.

FIG. 3 shows a development system that may be used to generate the attenuation waveforms for storage in the attenuation waveform storage 30 of the noise attenuation device 100, according to one embodiment. In this example, a noise source 200 is coupled to provide a synchronizing signal to a computer system 300. A microphone 120 or other sensor is configured to detect the noise generated by the noise source 200 and to provide a signal indicative of the detected noise to computer system 300.

The computer system 300 includes a processor 320 and a memory 310. The processor 320 may be a digital signal processor (DSP). The processor 320 may perform an algorithmic operation on the noise signal detected by the microphone 120 to generate an attenuation waveform. The processor 320 may store the attenuation waveform generated by the algorithmic operation along with an indication of one or more characteristics of the synchronizing waveform at the time the noise signal was detected in memory 310.

The computer system 300 may output the generated attenuation waveform to an actuator such as speaker 110. By measuring the noise detected by the microphone 120 while the attenuation waveform is being output to the speaker 110, the computer system 300 may determine the effectiveness of the noise attenuation provided by using the generated attenuation waveform. Based on this determination, the processor 320 may modify the generated attenuation waveform or generate a new attenuation waveform to improve the attenuation of the noise generated by noise source 200. The updated or new attenuation waveform may be stored with the current characteristic(s) of the synchronizing waveform in memory 310.

The computer system 300 may generate attenuation waveforms and store attenuation waveform/synchronizing signal characteristic pairs in memory 310 for each of several different synchronizing signal characteristics over the operating range of the noise source 200. For example, if the noise source 200 is or includes a fan, the fan may be operated at several different speeds. If the synchronizing signal for the fan is a tachometer signal, the tachometer signal may have a different frequency at each of the 5 different speeds. For each of several different tachometer signal frequencies, the computer system 300 may generate a new attenuation waveform and store the generated attenuation waveform and its association with that particular tachometer signal frequency in memory 310.

The computer system 300 may continue to generate attenuation waveforms until the computer system 300 has generated satisfactory waveforms for each desired point within the noise source's operating range. The final attenuation waveforms and their respective associations with different synchronizing signal characteristics may be used to program the noise attenuation device 100. For example, the synchronizing signal characteristic/attenuation waveform pairs may be stored in attenuation waveform memory 30 of noise attenuation device 100.

Figure 4:
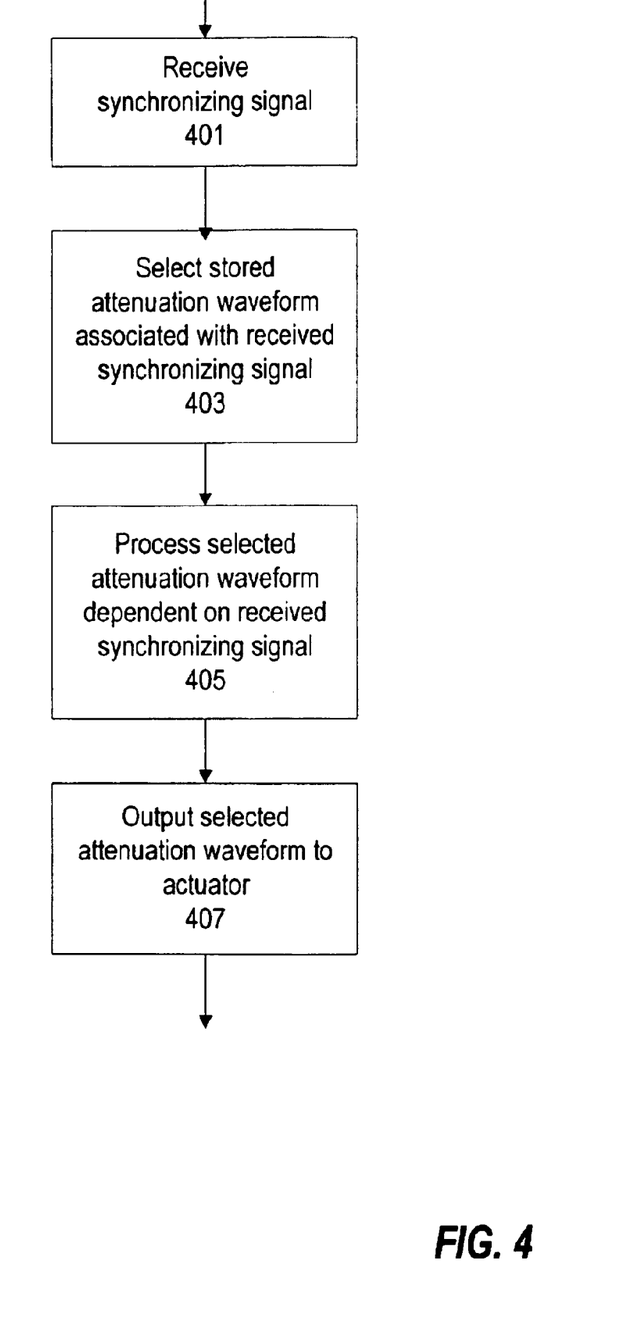
FIG. 4 illustrates one embodiment of a method of performing associative noise attenuation to reduce the noise generated by a noise source.

FIG. 4 illustrates one embodiment of a method of performing associative noise attenuation to reduce the noise generated by a noise source. At 401, a synchronizing signal is received. The synchronizing signal may be generated by the noise source in some embodiments. The synchronizing signal may not be an acoustic signal. For example, the synchronizing signal may be a tachometer signal indicative of how fast a rotating part within the noise source is rotating.

The synchronizing signal may have various characteristics, such as frequency and amplitude. Each value (or range of values) of one or more of these characteristics may be associated with a pre-defined attenuation waveform. Based on the current value of the characteristic(s) of the synchronizing signal, the associated pre-defined attenuation waveform may be selected, as shown at 403.

In some embodiments, the attenuation waveform selected at 403 may be additionally processed before being provided to an actuator, as shown at 405. For example, the selected attenuation waveform may be frequency- or amplitude-adjusted based on one or more characteristics of the synchronizing signal. Note that function 405 may not be implemented in some embodiments, however.

At 407, the selected attenuation waveform may be output to an actuator such as a speaker. In response, the speaker may output a noise that attenuates all or part of the noise generated by a noise source with which the synchronizing signal received at 401 is associated.

Note that at least a portion of the system shown in FIG. 1 may be implemented as an integrated circuit. Additionally, the system shown in FIG. 1 may be incorporated into a larger system that implements additional functionality. For example, in one embodiment, the noise attenuation device 100 may be incorporated in an existing EMC (Environmental Monitoring and Control) integrated circuit.

Numerous variations and modifications will become apparent to those skilled in the art once the above disclosure is fully appreciated. It is intended that the following claims be interpreted to embrace all such variations and modifications.

What is claimed is:

1. A system, comprising:
    a memory configured to store a plurality of attenuation waveforms;
    control logic configured to receive a synchronizing signal indicative of an operating characteristic of a noise source, wherein the control logic is configured to output multiple attenuation waveforms from the memory if the multiple attenuation waveforms are associated with a value of a characteristic of the synchronizing signal;
    wherein attenuating noise generated dependent on the multiple attenuation waveforms attenuates a noise generated by the noise source.

2. The system of claim 1, further comprising a DAC (Digital to Analog Converter) configured to generate an analog attenuation signal from a digital representation of the plurality of attenuation waveforms stored in the memory.

3. The system of claim 2, further comprising an actuator configured to generate the attenuating noise in response to the analog attenuation signal from the DAC.

4. The system of claim 1, wherein the memory is configured to store digital representations of the plurality of attenuation waveforms, wherein each of the digital representations is associated with a respective value of the characteristic of the synchronizing signal.

5. The system of claim 1, wherein the attenuation waveforms are associated with ranges of values of the characteristic of the synchronizing signal, and wherein the control logic is configured to output the multiple attenuation waveforms from the memory if the value of the operating characteristic is within the range of values of the characteristic.

6. The system of claim 5, further comprising a processing device configured to modify the multiple attenuation waveforms dependent on the value of the characteristic prior to generation of the attenuating noise dependent on the multiple attenuation waveforms.

7. The system of claim 6, wherein the processing device is configured to adjust amplitudes of the multiple attenuation waveforms dependent on the value of the characteristic.

8. The system of claim 6, wherein the processing device is configured to adjust a frequencies of the multiple attenuation waveforms dependent on the value of the characteristic.

9. The system of claim 1, wherein the control logic is configured to output the multiple attenuation waveforms from the memory if an associated value of the characteristic associated with the multiple attenuation waveforms is closer to the value of the characteristic of the synchronizing signal than any other associated value of the characteristic associated with other attenuation waveforms stored in the memory;
    wherein the control logic is configured to perform interpolation on the multiple attenuation waveforms dependent on a relationship between the value of the characteristic of the synchronizing signal and the associated value of the characteristic associated with the multiple attenuation waveforms and to generate a new attenuation waveform based on interpolation results.

10. The system of claim 1, wherein the characteristic of the synchronizing signal is a frequency, wherein the synchronizing signal is a tachometer signal indicative of revolutions per unit time of a rotating component included in the noise source.

11. The system of claim 1, wherein the synchronizing signal is indicative of an air density measured proximate to the noise source.

12. The system of claim 1, wherein the synchronizing signal is indicative of a system load of the noise source, wherein the noise source includes a power supply.

13. The system of claim 1, wherein the synchronizing signal is a non-acoustic signal.

14. The system of claim 1, wherein the memory and the control logic are implemented on an integrated circuit, and wherein the integrated circuit includes logic configured to perform additional environmental control and monitoring functions.

15. The system of claim 1, wherein the control logic updates one or more of the attenuation waveforms stored in the memory based on the synchronizing signals.

16. The system of claim 1, wherein the system and the noise source are included in a computer system.

17. A method, comprising:
    a memory storing a plurality of attenuation waveforms;
    receiving a synchronizing signal indicative of an operating characteristic of a noise source;
    if multiple of the attenuation waveforms is associated with a value of a characteristic of the synchronizing signal, outputting the multiple attenuation waveforms from the memory in response to receiving the synchronizing signal;
    an actuator generating an attenuating noise dependent on the attenuation waveforms in response to said outputting.

18. The method of claim 17, further comprising converting a digital representation of the multiple attenuation waveforms stored in the memory to an analog attenuation signal and providing the analog attenuation signal to the actuator.

19. The method of claim 17, wherein said storing comprises the memory storing digital representations of the plurality of attenuation waveforms, wherein each of the digital representations is associated with a respective value of the characteristic of the synchronizing signal.

20. The method of claim 17, wherein the multiple attenuation waveforms are associated with a range of values of the characteristic of the synchronizing signal.

21. The method of claim 20, further comprising modifying the multiple attenuation waveforms according to the value of the characteristic of the synchronizing signal.

22. The method of claim 21, wherein said modifying comprises adjusting amplitudes of the multiple attenuation waveforms dependent on the value of the characteristic of the synchronizing signal.

23. The method of claim 21, wherein said modifying comprises adjusting frequencies of the multiple attenuation waveforms dependent on the value of the characteristic of the synchronizing signal.

24. The method of claim 17, further comprising:

outputting the multiple attenuation waveforms from the memory if an associated value of the characteristic of the synchronizing signal associated with the multiple attenuation waveforms is a closest one of a plurality of associated values to the value of the characteristic of the synchronizing signal, wherein each of the plurality of associated values is associated with multiple respective attenuation waveforms stored in the memory; and performing interpolation on the multiple attenuation waveforms dependent on a relationship between the value of the characteristic of the synchronizing signal and the associated value of the operating characteristic associated with the multiple attenuation waveforms.

25. The method of claim 17, wherein the synchronizing signal is a tachometer signal indicative of a number of revolutions per unit time of a rotating part of the noise source, and wherein the characteristic of the synchronizing signal is a frequency.

26. The method of claim 17, wherein the synchronizing signal is indicative of an air density measured proximate to the noise source.

27. The method of claim 17, wherein the synchronizing signal is indicative of a system load of the noise source, wherein the noise source includes a power supply.

28. The method of claim 17, wherein the synchronizing signal is indicative of a non-acoustic operating characteristic of the noise source.

29. The method of claim 17, further comprising:

operating a development system to generate the attenuation waveforms; and writing the attenuation waveforms to the memory, wherein the memory is included in an integrated circuit configured to perform said receiving and said outputting.

30. The method of claim 29, wherein said operating the development system comprises:

operating the noise source over a range of values of the operating characteristic indicated by the synchronizing signal; and the development system generating multiple respective attenuation waveforms for each of a plurality of values of the operating characteristic indicated by the synchronizing signal;

wherein said writing comprises writing each of a plurality of attenuation waveforms generated by the development system to the memory included in the integrated circuit.

31. The method of claim 29, wherein said operating the development system comprises a digital signal processor included in the development system performing an algorithmic operation on a noise signal indicative of noise generated by the noise source to generate the digital representations of the attenuation waveforms.

32. The method of claim 17, further comprising:

receiving a plurality of synchronizing signals, wherein each of the plurality of synchronizing signals is indicative of an operating characteristic of a respective noise source;

selecting multiple associated attenuation waveforms from the memory for each of the plurality of synchronizing signals;

combining a plurality of associated attenuation waveforms selected by said selecting;

the actuator generating an attenuating noise dependent on a compound attenuation waveform generated by said combining.

* * * * *

UNITED STATES PATENT AND TRADEMARK OFFICE
CERTIFICATE OF CORRECTION

PATENT NO. : 6,825,786 B1
DATED : November 30, 2004
INVENTOR(S) : MacDonald et al.

It is certified that error appears in the above-identified patent and that said Letters Patent is hereby corrected as shown below:

Column 9,
Line 61, please delete "adjust a frequencies" and substitute -- adjust frequencies --.

Signed and Sealed this

Nineteenth Day of July, 2005

JON W. DUDAS
*Director of the United States Patent and Trademark Office*